Patented Nov. 28, 1950

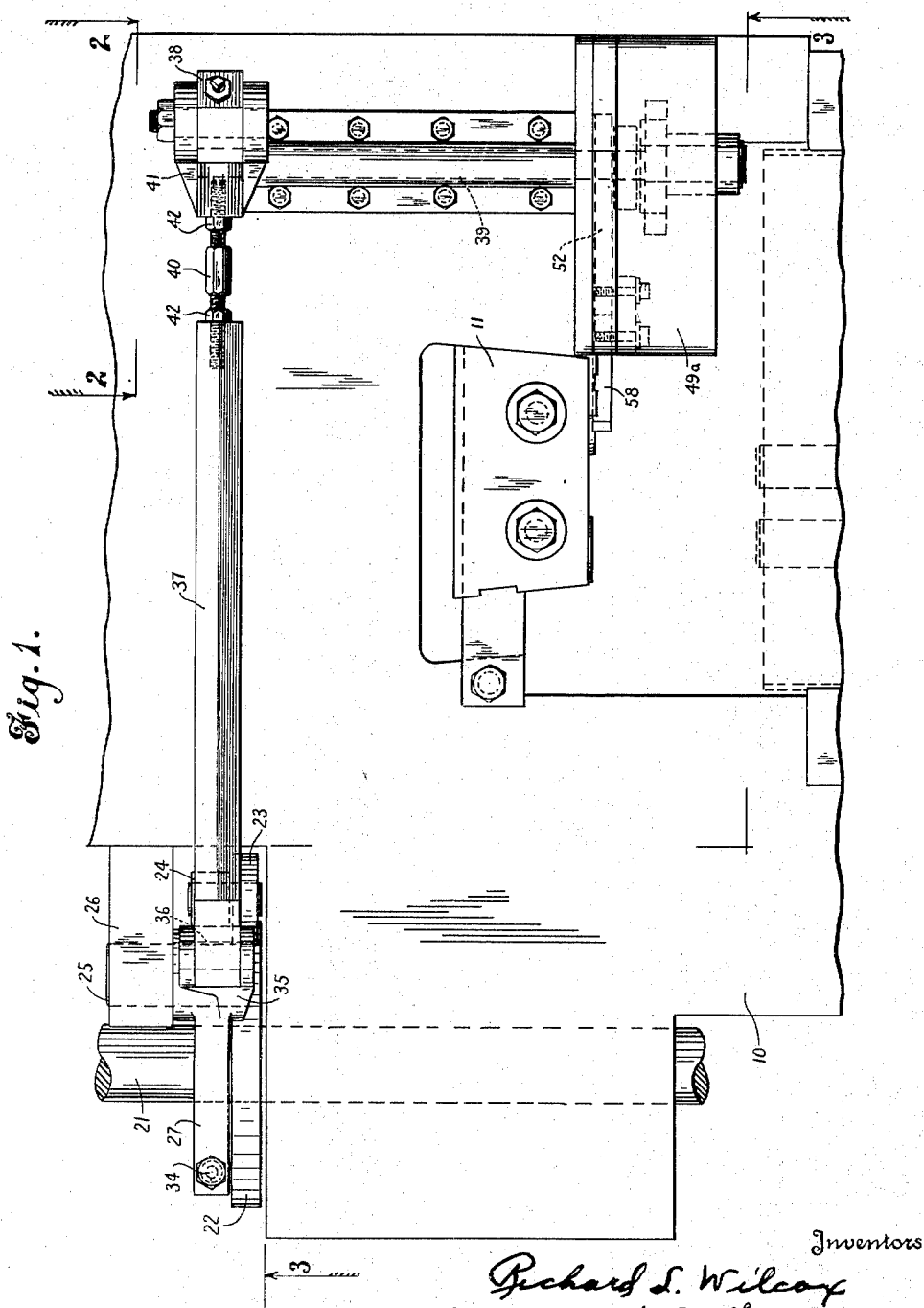

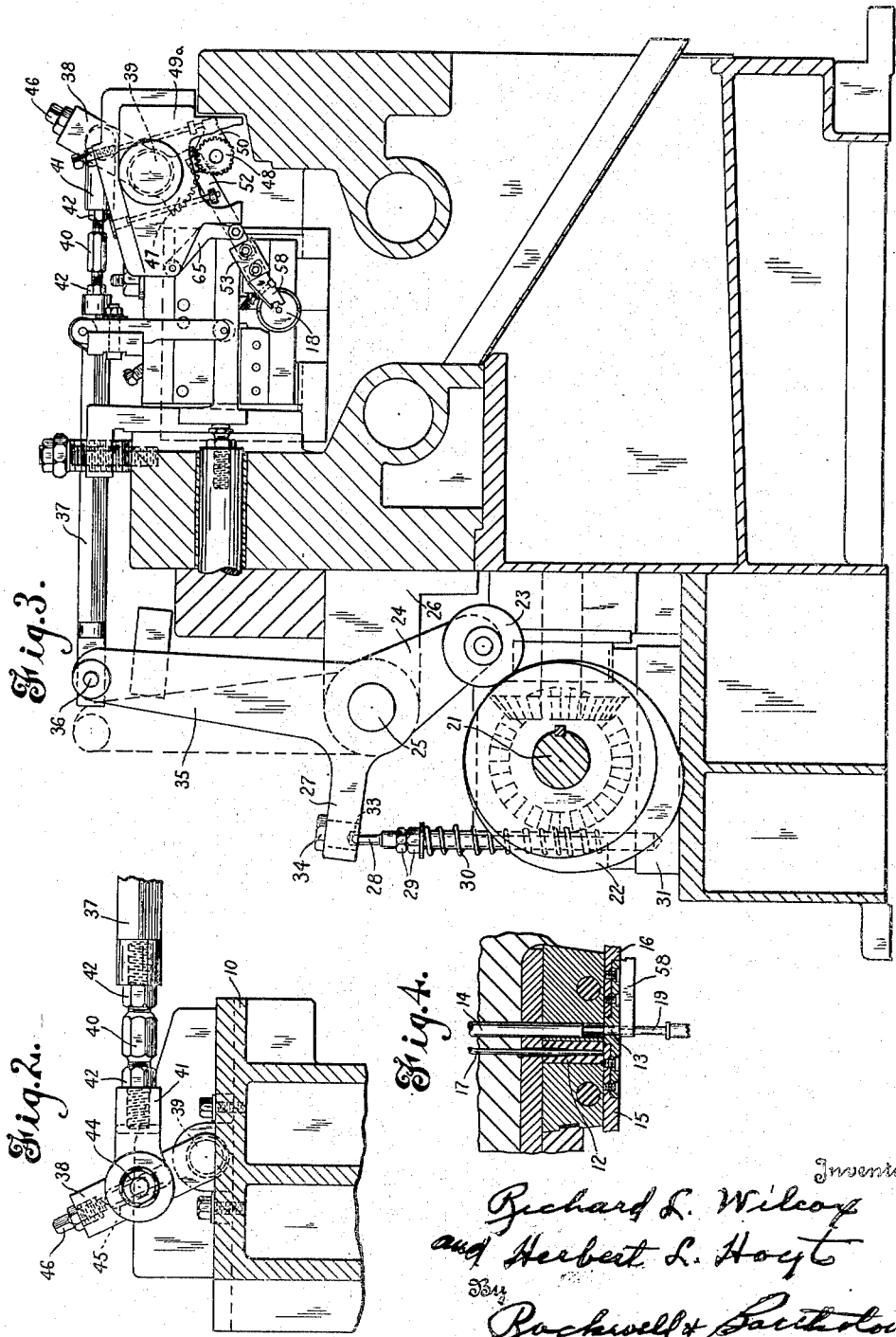

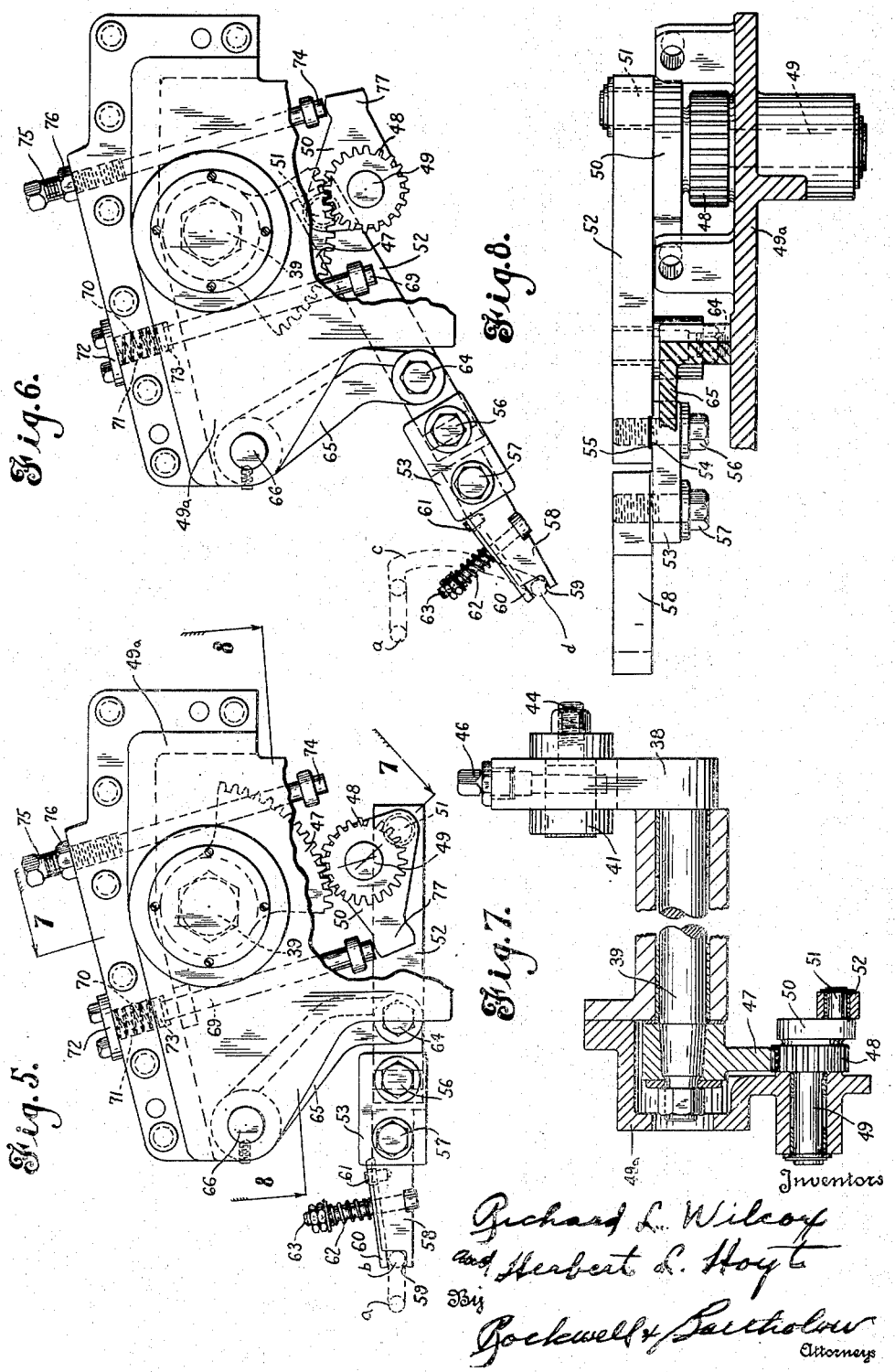

2,532,213

UNITED STATES PATENT OFFICE 2,532,213

MECHANICAL MOVEMENT

Richard L. Wilcox and Herbert L. Hoyt, Waterbury, Conn., assignors to The Waterbury Farrel Foundry and Machine Company, Waterbury, Conn., a corporation of Connecticut Application June 18, 1947, Serial No. 755,439

11 Claims. (Cl. 74—47)

This invention relates to work transfer mechanism for headers, upsetting machines, or the like, although it is not limited to use in this class of devices.

As illustrated in the drawings, the invention is applied to a machine wherein a blank is cut from rod or wire stock, moved laterally by the cutters to a position opposite a knock-out rod, and there pushed out of the cutters into the fingers of the work transfer mechanism by which it is transferred to another station opposite the fabricating die. In this position, it is acted upon by a punch or other upsetting means, the transfer mechanism holding the workpiece in position until engaged by the tools.

It will be apparent that for fast operation it is necessary that the movements of the transfer mechanism be accurately timed so as to receive the workpiece from the cutters and deliver it to a position opposite the fabricating die at the proper time in the operation of the working tools, and, also, the transfer mechanism should be formed of parts of relatively light weight, so that rapid and accurate movements of the transfer mechanism are possible.

As shown in the present drawings, the wire or rod line and the push-out line are substantially in the same horizontal plane and the fabricating or working die is in a position below, and substantially in the vertical plane of, the push-out line, and, as will be obvious from the description, the transfer mechanism receives the workpiece at the push-out station and carries it in a substantially vertical direction to the fabricating station and then returns over the same path to a position in which it may receive another workpiece.

On object of the present invention is to provide a transfer mechanism which may be constructed of relatively light parts, so that it will have a rapid and accurate movement between its receiving and delivering positions.

Another object of the invention is to provide a transfer mechanism which may be accurately positioned to receive the workpiece from the cutters and transfer it to the exact position desired with respect to the fabricating die.

A still further object of the invention is to provide a transfer mechanism of the character described, which may be accurately controlled and adjusted, so that it may be actuated rapidly and efficiently in order to make possible an increased speed of the machine with which the mechanism is employed.

To these and other ends the invention consists in the novel features and combinations of parts to be hereinafter described and claimed.

In the accompanying drawings:

Figure 1 is a top plan view of a portion of a header or upsetting machine embodying my invention;

Fig. 2 is a detail sectional view on line 2—2 of Fig. 1;

Fig. 3 is a sectional view on line 3—3 of Fig. 1;

Fig. 4 is a horizontal sectional view through the cut-off die and push-out station;

Fig. 5 is a detail front elevational view of the transfer fingers and associated mechanism;

Fig. 6 is a view similar to Fig. 5 showing the parts in another position;

Fig. 7 is a sectional view on line 7—7 of Fig. 5; and

Fig. 8 is a sectional view substantially on line 8—8 of Fig. 5.

To illustrate a preferred embodiment of our invention, we have shown in Fig. 1 the frame 10 of a heading or like machine, this frame supporting a die block 11 in which is mounted, as shown in Fig. 4, for example, a cut-off die 12 and adjacent thereto a push-out or knock-out opening 13 in which is slidably mounted a knock-out punch 14. The cutters are shown at 15 and 16, and, as is usual in machines of this character, the cutters engage and cut off a suitable length of workpiece 17 opposite the opening in the die 12 and then carry the workpiece horizontally to a position opposite the knock-out punch 14, at which time the latter is actuated to move the workpiece out of the cutters.

It will also be understood that the die block is provided with a fabricating die 18, as shown in Fig. 3. It will be obvious that it is necessary to transfer the workpiece, shown at 19 in Fig. 4, from its position opposite the knock-out punch 14 to the lower position opposite the die 18 in order that it may be operated upon by the fabricating tool. The mechanism for effecting this transfer will now be described.

In the frame 10 is mounted a side shaft 21 suitably actuated from the main power shaft of the machine, upon which shaft is mounted a suitably shaped cam 22. Engaging this cam is a cam follower or roller 23 attached to one arm 24 of a bell-crank lever pivotally mounted on a pin 25 supported by a bracket arm 26.

Pressing upwardly on another arm 27 of this bell-crank lever is a push rod 28 having adjusting nuts 29 thereon against which bears a spring 30 which surrounds the push rod, the lower end of the spring acting against a fixed plate 31 on the frame of the machine. The upper end of the push rod 28 seats in a recess 33 in a screw plug 34 in the lever arm 27. It will be apparent, therefore, that the spring 30 urges the arm 27 of the bell-crank lever upwardly or in a clockwise direction about the pin 25, as shown in Fig. 3, and maintains the cam follower 23 in engagement with the cam 22.

This bell-crank lever is also provided with an upwardly extending arm 35 to which is pivoted, by pin 36, a link 37, this link being connected at its other end to a rock arm 38 formed integrally with a rock shaft 39 suitably mounted in the frame 10 of the machine. In order that the effective length of the link 37 may be adjusted, an adjusting screw 40 having right- and left-hand threads is secured at one side thereto, the other end of this screw being secured to the forked connection 41. Lock nuts 42 are provided to lock the adjusting screw in the desired position. The forked connection end 41 is pivotally attached to a stud 44 adjustably mounted in a slot 45 in the rock arm 38 and held in adjusted position by the screw 46. It will be understood that adjustment of the screw 40 provides an adjustment of the position of the rock arm 38 with respect to the arm 35 of the bell-crank lever, while adjustment of the stud 44 in the slot 45 provides for greater or less throw of the arm 38 and shaft 39.

As shown more especially in Fig. 7, a sector gear 47 is secured to the opposite end of the shaft 39, the teeth of which sector gear are in engagement with the teeth of a pinion 48 rigidly secured to, or formed integrally with, a short rock shaft or stud shaft 49, rockably mounted in the guard frame 49ª. Formed integrally with the shaft 49 is a crank member 50 carrying an eccentric crank pin 51 to which is pivoted one end of a finger bar 52.

At the other end of the finger bar 52 is secured a block 53, this block being provided with a tongue 54 adjustable in a groove 55 in the bar 52 and being held in adjusted position by the screw 56. Secured to the block 53 by screw 57 is the transfer finger 58, this finger being provided with a work-receiving notch 59 and also carrying a latch plate 60 connected to the finger at 61 and urged toward the finger by a compression spring 62 which surrounds a stud 63 secured to the finger. Pivoted to the finger bar 52 intermediate its ends, as at 64, is a link 65 fulcrumed on a stud 66 secured in the guard member 49ª.

From the above construction, it will be seen that the rear end of the finger bar is rocked in an arcuate path, while the front end of this bar will be guided and controlled by the connection of the arm 65 therewith, thus providing accurate controlling and seating of the work-receiving notch 59.

Mounted in the guard member 49ª is a stop pin 69, this pin being urged downwardly by a spring 70 seated in a socket 71 in the guard member and held therein by the retaining plate 72, this spring acting against the head 73 of the stop pin 69. The bottom of the socket limits the movement of the pin in one direction, or downwardly, as shown in Fig. 6. On the other side of shaft 39 is a second stop pin 74, this pin being rigidly held in position by an adjusting screw 75 bearing against the upper end thereof and locked in position by the nut 76. It will be understood that, while the stop pin 69 is yieldable in one direction, it is not necessary for the stop pin 74 to be yieldable for, as will be understood, when the stop pin 74 is operative, the transfer mechanism will be under control of the spring 30 (Fig. 3), which, in holding the cam follower 23 against the cam 22, moves the rock arm 35 and, therefore, the shaft 39 in one direction.

Integrally formed with the crank 50 is a stop arm 77 which, in the position of the parts shown in Fig. 5, is adapted to engage the lower end of the pin 69, while, when the parts are at the other limit of their movement, this arm 77 is engaged with the fixed stop 74.

The operation of the mechanism may be briefly described as follows:

The work comprising the rod or wire 17 is moved through the die 12 by the usual means, and a suitable length is severed by the cutters 15 and 16 to form the workpiece 19. This operation is performed in the position shown at a in Figs. 5 and 6. The cutters are then caused to move laterally and move the workpiece to the position b in which it is engaged in the notch 59. It will be understood that the cam 22 is so shaped that the finger 58 will stand in the position shown in Fig. 5, when the follower 23 stands upon a dwell on the cam, so that, when the workpiece is moved laterally to a position opposite the knock-out punch 14, the notch 59 will be ready to receive it. At this time, the cam follower 23 is on the high point of the cam 22, and the arm 77 will be lodged against the yielding stop pin 69.

Upon continued rotation of the shaft 21, the follower 23 travels off the high point of the cam, and the shaft 39 is rocked by the spring 30, thus rocking the crank 50 from the position shown in Fig. 5 to the position shown in Fig. 6, where the arm 77 engages the fixed stop pin 74. This moves the notch 59 of the transfer finger 58 and the blank therein through the dotted-line path designated at c in Fig. 6 to the final dotted-line position shown at d wherein the workpiece stands opposite the fabricating die 18.

It will be seen that in the movement of the shaft 49 from the position shown in Fig. 5 to that shown in Fig. 6, the crank pin 51 moves in a counterclockwise direction and generally rearwardly of a line between the centers of the shafts 39 and 49 and, of course, moves in an arcuate path. Likewise, the pivot point 64 of the arm 65 with the bar 52 moves in an arcuate path about the pivot 66. This path, however, will be generally in the direction of the bar 52, or generally in a horizontal direction, while the movement of the pivoted end of the finger bar is generally in a vertical direction.

It will be seen that adjustment of the screw 75 will serve to limit the position of the lower end of the fixed stop pin 64 and thus determine the limit position of the finger bar 52 and the finger 58. The position of the latter, however, may also be controlled by adjustment of the finger block 53 by means of the tongue 54, groove 55, and set screw 56. Thus the finger 58 may be adjusted to an exact position to receive the workpiece 19 when it is carried horizontally by the cutters.

While we have shown and described a preferred embodiment of our invention, it will be understood that it is not to be limited to all of the details shown, but is capable of modification and variation within the spirit of the invention and within the scope of the claims.

What we claim is:

1. Work transfer mechanism for headers or the like having a frame, comprising a rock shaft mounted in the frame, a crank member carried by the rock shaft, a bar having one end pivoted to the crank member, a finger on the other end of said bar to engage the work-piece, a guide link pivoted to the frame and to the bar at a point fixed longitudinally of the bar to control the movement of the latter, and means on the frame operatively connected to said shaft for oscillating said shaft.

2. Work transfer mechanism for headers or the like having a frame, comprising a rock shaft mounted in the frame, a crank member carried by the rock shaft, a bar pivoted to the crank member, a finger on said bar to engage the work-piece, a guide link pivoted to the frame and pivoted to the bar at a point between the crank member and the finger to constrain the movement of the bar to an arcuate path about the point of pivot of said guide link on the frame, the effective length of said link being greater than that of the crank member, and means on the frame operatively connected to said shaft for oscillating said shaft.

3. Work transfer mechanism for headers or the like having a frame, comprising a rock shaft mounted in the frame, a crank member carried by the rock shaft, a bar pivoted to the crank member, a finger on said bar to engage the work-piece, a guide link pivoted to the frame and to the bar to control the movement of the latter, means on the frame operatively connected to said shaft for oscillating said shaft, and adjustable means on the frame engaging said crank member to limit the movement thereof, said guide link constraining its point of pivotal connection with the bar to movement in an arcuate path about the point at which the link is pivoted to the frame.

4. Work transfer mechanism for headers or the like having a frame, comprising a rock shaft mounted in the frame, a crank member carried by the rock shaft, a bar pivoted directly to the crank member, a finger on said bar to engage the work-piece, a guide link pivoted to the frame and to the bar to control the movement of the latter, the effective length of said link being greater than that of the crank member, and means for oscillating said shaft, said last-named means comprising a second rock shaft mounted on said frame and operatively connected to said first rock shaft, said guide link constraining its point of pivotal connection with the bar to movement in an arcuate path about the point at which the link is pivoted to the frame.

5. Work transfer mechanism for headers or the like having a frame, comprising a rock shaft mounted in the frame, a crank member carried by the rock shaft, a bar pivoted to the crank member, a finger on said bar to engage the work-piece, a guide link pivoted to the frame and to the bar at a point fixed in the direction of the length of the bar to control the movement of the latter, means for oscillating said shaft, said last-named means comprising a second rock shaft mounted on said frame and operatively connected to said first rock shaft, and cam means on the frame operatively connected to said second rock shaft and actuating this shaft.

6. In a work transfer mechanism for heading or like machines, a frame, a finger bar, work-engaging means adjacent one end of said bar, means on the frame operatively connected to the finger bar, to move the other end of said bar in an arcuate path, and a link freely pivoted to the frame and to an intermediate portion of the bar, said link constraining such portion of the bar to movement over an arcuate path about a fixed point on the frame, the direction of which is generally transverse to the first-named arcuate path.

7. In a work transfer mechanism for heading or like machines, a frame, a finger bar, work-engaging means carried by said bar adjacent one end thereof, a link pivoted to the frame and to an intermediate point on the bar to constrain said point to an arcuate movement about the point on the frame at which the link is pivoted, means to oscillate the other end of said bar in an arcuate path, said last-named means comprising a rock shaft on the frame having a crank member connected to the bar, and stop members on the frame engaging the crank member to limit the movement thereof in both directions.

8. In a work transfer mechanism for heading or like machines, a frame, a finger bar, work-engaging means carried by said bar adjacent one end thereof, a link pivoted to the frame and to an intermediate point on the bar to constrain said point to an arcuate movement about the point on the frame at which the link is pivoted, means to oscillate the other end of said bar in an arcuate path, said last-named means comprising a rock shaft on the frame having a crank member connected to the bar, and stop members on the frame engaging the crank member to limit the movement thereof in both directions, one of the stop members being rigid and the other a yielding stop member.

9. In a work transfer mechanism for heading or like machines, a frame, a finger bar, work-engaging means adjacent one end of said bar, a link pivoted to the frame and to an intermediate point on the bar to constrain said point to an arcuate movement about the point on the frame at which the link is pivoted, means to oscillate the other end of said bar in an arcuate path, said last-named means comprising a rock shaft on the frame having a crank member connected to the bar, and a second shaft rockably mounted on the frame and connected to said first shaft.

10. In a work transfer mechanism for heading or like machines, a frame, a finger bar, work-engaging means carried by said bar adjacent one end thereof, a link pivoted to the frame and to an intermediate point on the bar to constrain said point to an arcuate movement about the point on the frame at which the link is pivoted, means to oscillate the other end of said bar in an arcuate path, said last-named means comprising a rock shaft on the frame having a crank member connected to the bar, a second shaft rockably mounted on the frame having a gear thereon, and a gear on said first shaft meshing with said first-named gear.

11. In a work transfer mechanism for heading or like machines, a frame, a finger bar, work-engaging means adjacent one end of said bar, a link pivoted to the frame and to an intermediate point on the bar to constrain said point to an arcuate movement about the point on the frame at which the link is pivoted, means to oscillate the other end of said bar in an arcuate path, and said work-engaging means being connected to said bar for adjustment transversely of the length thereof.

RICHARD L. WILCOX.
HERBERT L. HOYT.

REFERENCES CITED

The following references are of record in the file of this patent:

UNITED STATES PATENTS

| Number | Name | Date |
|---|---|---|
| 11,252 | Thompson | July 11, 1854 |
| 139,000 | George | May 20, 1873 |
| 959,455 | Campbell | May 31, 1910 |
| 1,174,814 | Brennan | Mar. 7, 1916 |
| 2,070,941 | Dust | Feb. 16, 1937 |
| 2,272,592 | Wilcox | Feb. 10, 1942 |
| 2,276,941 | Deloghia | Mar. 17, 1942 |

FOREIGN PATENTS

| Number | Country | Date |
|---|---|---|
| 37,583 | Austria | Aug. 10, 1909 |
| 492,296 | Germany | Feb. 21, 1930 |